(12) United States Patent
In et al.

(10) Patent No.: US 8,640,446 B2
(45) Date of Patent: Feb. 4, 2014

(54) SYSTEM FOR PURIFYING EXHAUST GAS AND METHOD FOR CONTROLLING THE SAME

(75) Inventors: Chibum In, Yongin (KR); Jin Ha Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/315,223

(22) Filed: Dec. 8, 2011

(65) Prior Publication Data

US 2013/0061573 A1 Mar. 14, 2013

(30) Foreign Application Priority Data

Sep. 9, 2011 (KR) .................. 10-2011-0091806

(51) Int. Cl.
*F01N 3/00* (2006.01)
(52) U.S. Cl.
USPC ............. 60/295; 60/276; 60/286; 60/289; 60/297
(58) Field of Classification Search
USPC ............ 60/276, 286, 289, 295, 297, 303, 311
See application file for complete search history.

(56) References Cited

U.S. PATENT DOCUMENTS

| | | | |
|---|---|---|---|
| 4,404,796 A * | 9/1983 | Wade | 60/274 |
| 6,293,096 B1 | 9/2001 | Khair et al. | |
| 6,904,752 B2 * | 6/2005 | Foster et al. | 60/295 |
| 6,912,847 B2 | 7/2005 | Deeba | |
| 8,341,947 B2 * | 1/2013 | Hepburn et al. | 60/297 |
| 2005/0016164 A1 | 1/2005 | Chiffey et al. | |
| 2006/0059900 A1 | 3/2006 | Harada et al. | |
| 2010/0005786 A1 | 1/2010 | Hinz et al. | |
| 2010/0071656 A1 * | 3/2010 | Freese et al. | 123/198 F |
| 2011/0073088 A1 * | 3/2011 | Hubbard et al. | 123/703 |
| 2011/0120090 A1 * | 5/2011 | Sorensen, Jr. | 60/274 |
| 2011/0203258 A1 * | 8/2011 | Makartchouk et al. | 60/274 |
| 2011/0258993 A1 | 10/2011 | Goersmann et al. | |

FOREIGN PATENT DOCUMENTS

| | | |
|---|---|---|
| JP | 2010-106753 A | 5/2010 |
| KR | 10-0960234 B1 | 6/2010 |
| KR | 10-2011-0024598 A | 3/2011 |

* cited by examiner

*Primary Examiner* — Binh Q Tran
(74) *Attorney, Agent, or Firm* — Morgan, Lewis & Bockius LLP

(57) ABSTRACT

An exhaust gas purification device may deactivate at least one of cylinders to supply a gasoline particulate filter with sufficient air according to a driving condition of a gasoline engine, and a control method thereof and a control method thereof may include comparing a pressure difference of the gasoline particulate filter with a predetermined value, determining a cylinder that may be to be deactivated when the pressure difference may be larger than the predetermined value, regenerating the gasoline particulate filter by supplying it with air through the deactivated cylinder, determining whether the engine may be in an over-run condition during the regeneration process, and returning to a general driving condition in a case that the engine may be in the over-run condition.

7 Claims, 3 Drawing Sheets

SYSTEM FOR PURIFYING EXHAUST GAS AND METHOD FOR CONTROLLING THE SAME

CROSS-REFERENCE TO RELATED APPLICATION

The present application claims priority to Korean Patent Application No. 10-2011-0091806 filed in the Korean Intellectual Property Office on Sep. 9, 2011, the entire contents of which is incorporated herein for all purposes by this reference.

BACKGROUND OF THE INVENTION

1. Field of the Invention

The present invention relates to an exhaust gas purification device and a control method thereof. More particularly, the present invention relates to an exhaust gas purification device that can supply a gasoline particulate filter with enough oxygen to regenerate it and a control method thereof.

2. Description of Related Art

Generally, a gasoline direct injection (GDI) art has been developed so as to improve fuel consumption efficiency and performance of an internal combustion engine, wherein the GDI engine does not inject fuel into an intake pipe, but direct injects the fuel into a combustion chamber.

Since the air/fuel ratio is low (dense fuel) around a spark plug, an engine is operated in a lean fuel condition, but there is a problem that a gasoline direct injection engine (GDI) generates a large amount of particulate matter (PM) according to an incomplete combustion period increment in a combustion chamber.

It is necessary to correspond to PM exhaust regulations and PM nanoparticle amount regulations for a GDI engine equipped vehicle of the EURO 6 standards. For this, research into applying a particulate filter that is used for a diesel engine to a gasoline engine to correspond to the emission regulations has been developed.

However, because the gasoline engine is operated at an ideal air/fuel ratio, there is not sufficient oxygen for burning PM that is trapped in the gasoline particulate filter, regenerating the filter is difficult, and long regeneration time is necessary.

In a conventional art, a device for supplying a particulate filter with oxygen to resolve the above problem is used.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an exhaust gas purification device having advantages of smoothly performing regeneration of a particulate filter according to driving conditions of an engine, and a control method thereof.

An exhaust gas purification device having a gasoline particulate filter that is disposed on an exhaust pipe of a gasoline engine, may include the engine that may include a plurality of cylinders of which at least one thereof is selectively deactivated, the gasoline particulate filter that is disposed on the exhaust pipe that is connected to the engine so as to trap particulate matter of exhaust gas of the engine, pressure difference sensors that are respectively disposed at a downstream side and an upstream side of the gasoline particulate filter to measure a pressure difference of the gasoline particulate filter, and an electronic control unit (ECU) that receives the measured pressure difference from the pressure difference sensors and detected control parameters through a control parameter measuring portion to determine cylinders to be deactivated, and that supplies the gasoline particulate filter with air through the deactivated cylinders so as to regenerate the gasoline particulate filter.

The exhaust gas purification device may further include a three-way catalyst that is disposed at an upstream side of the gasoline particulate filter.

The control parameters may include a driving condition of the engine and a condition of the gasoline particulate filter, wherein no driving problems are caused in a condition that a portion of the cylinders are deactivated.

In another aspect of the present invention, a control method of an exhaust gas purification device of an engine that may include a plurality of cylinders of which at least one thereof is selectively deactivated and a gasoline particulate filter that is disposed on an exhaust pipe that is connected to the engine so as to trap particulate matter of exhaust gas of the engine, may include a pressure difference of the gasoline particulate filter in a downstream side and an upstream side thereof with a predetermined value, determining a cylinder that is to be deactivated when the pressure difference is larger than the predetermined value, regenerating the gasoline particulate filter by supplying the gasoline particulate filter with air through the deactivated cylinder, determining whether the engine is in an over-run condition during the regeneration process, and returning to a general driving mode when the engine is in the over-run condition.

The control method of an exhaust gas purification device may further include determining whether the gasoline particulate filter is regenerated when the over-run condition of the engine is not satisfied, and returning to the general driving mode when the regeneration is completed.

The control method of an exhaust gas purification device may further include returning to a step for determining a cylinder that is to be deactivated when the regeneration of the gasoline particulate filter is not completed.

The determination of the cylinder that is to be deactivated is performed with regard to a driving condition of the engine and a condition of the gasoline particulate filter.

An exemplary embodiment of the present invention prevents a cost increases and uses a simple device, because a separate air supply device is not necessary to regenerate a gasoline particulate filter for a GDI engine.

Also, the regeneration time is not delayed when a particulate filter is provided to a gasoline engine to improve fuel consumption efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
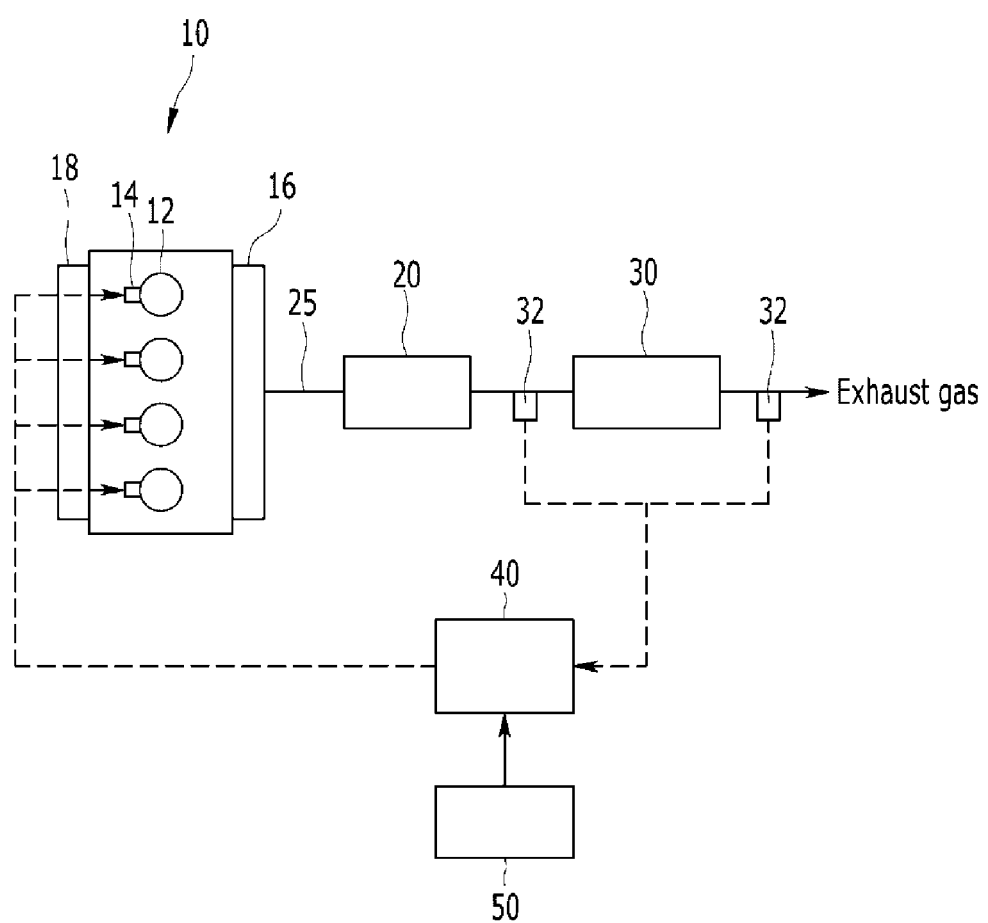
FIG. 1 and FIG. 2 are schematic diagrams of an exhaust gas purification device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described with reference to the accompanying drawings in order for those skilled in the art to be able to implement the invention.

Figure 2:
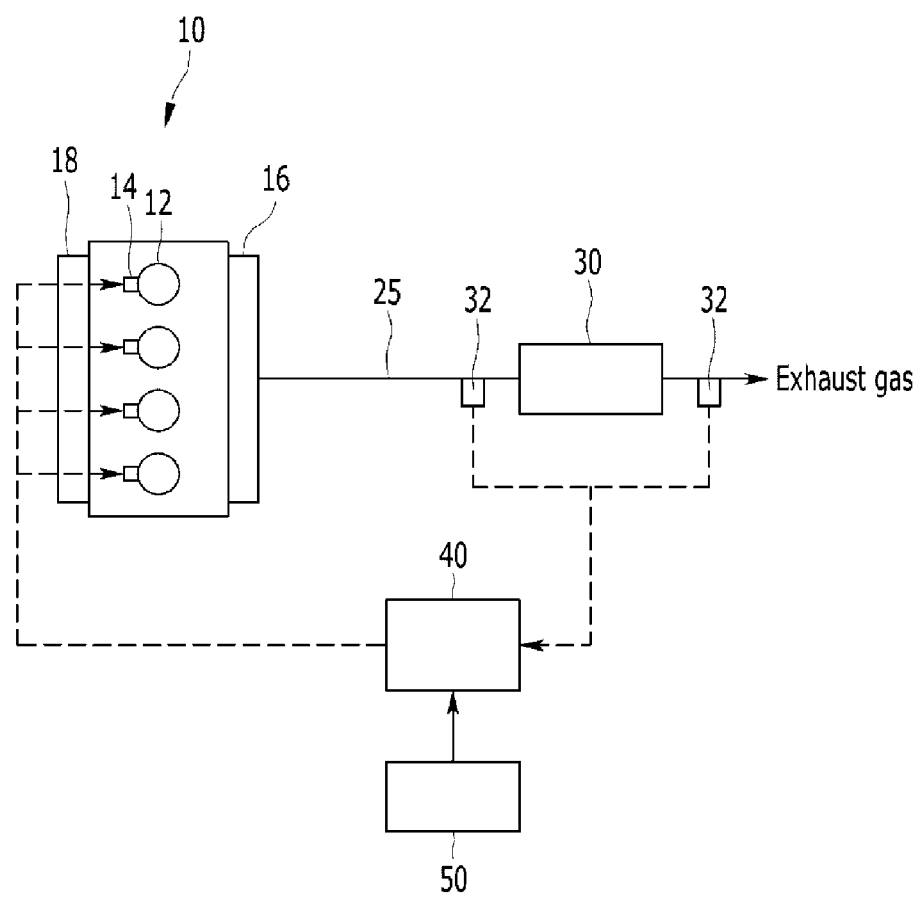

FIG. 2 shows a schematic diagram of an exhaust gas purification device according to an exemplary embodiment of the present invention, and FIG. 1 is a schematic diagram of a condition in which a three way catalyst is disposed at an upstream side of a gasoline particulate filter in FIG. 2.

As shown in FIG. 1 and FIG. 2, an exhaust gas purification device according to an exemplary embodiment of the present invention includes an engine 10, a gasoline particulate filter 30, and an ECU 40.

The engine 10 receives air through an intake manifold 18 and combusts a mixed gas of fuel and air to change chemical energy to mechanical energy, wherein fuel is direct injected into a cylinder 12 through an injector 14 and exhaust gas is exhausted outside through an exhaust manifold 16.

An exhaust pipe 25 is connected to the exhaust manifold 16, and the gasoline particulate filter 30 is disposed on the exhaust pipe 25 to trap particulate matter (PM) included in the exhaust gas.

In accordance with an exemplary embodiment of the present invention, because a spark ignition device, that is, the gasoline engine 10, is operated at an ideal air/fuel ratio, there is a problem that there is not sufficient oxygen for burning the PM trapped in the gasoline particulate filter (GPF) 30, it is determined whether a cylinder 12 is to be deactivated so as to resolve this problem and no fuel is supplied in the deactivation mode and only air is supplied thereto such that the gasoline particulate filter 30 is smoothly regenerated.

The term "deactivation" in an exemplary embodiment of the present invention denotes that only air is supplied to the cylinder without fuel. That is, the term "deactivation" denotes that a valve is normally lifted to supply air to a cylinder through the intake manifold 18 of the engine 10 and fuel is not injected into the cylinder.

A gasoline engine 10 having an exhaust gas purification device according to an exemplary embodiment of the present invention includes a plurality of cylinders 12, the gasoline particulate filter 30 that traps particulate matter of the exhaust gas from the engine 10, and pressure difference sensors 32 that measure pressures at a downstream side and an upstream side of the gasoline particulate filter 30, wherein the engine selectively deactivates a portion of the cylinders 12 according to a driving condition thereof.

Also, the engine further includes the ECU 40 that evaluates the difference of the pressures that are measured by the pressure difference sensors 32 with regard to control parameters, and the ECU 40 recognizes driving conditions of the engine 100 from the pressure difference and the control parameters, determines how many cylinders 12 are to be deactivated, and deactivates the cylinders 12 that are to be deactivated to regenerate the gasoline particulate filter 30.

In this configuration, a three-way catalyst (TWC) 20 is disposed on an upstream side of the exhaust pipe 25 so as to purify the exhaust gas, the TWC 20 reacts with carbon monoxide, nitrogen oxide, and hydrocarbon compounds to reduce these, and the TWC 20 can include Pd, Pt/Rh, Pd/Rh, or Pt/Pd/Rh.

The control parameters includes a driving condition of an engine 10 according to a driving state (high load or low load) thereof and a condition of a gasoline particulate filter 30 such as a degradation degree thereof, wherein an air amount that is necessary to regenerate the gasoline particulate filter 30 is determined by the control parameters and is input to the ECU 40 through a control parameter measuring portion 50.

In this case, while a portion of the cylinders is deactivated, the engine can be normally operated in the driving condition of the engine.

Figure 3:
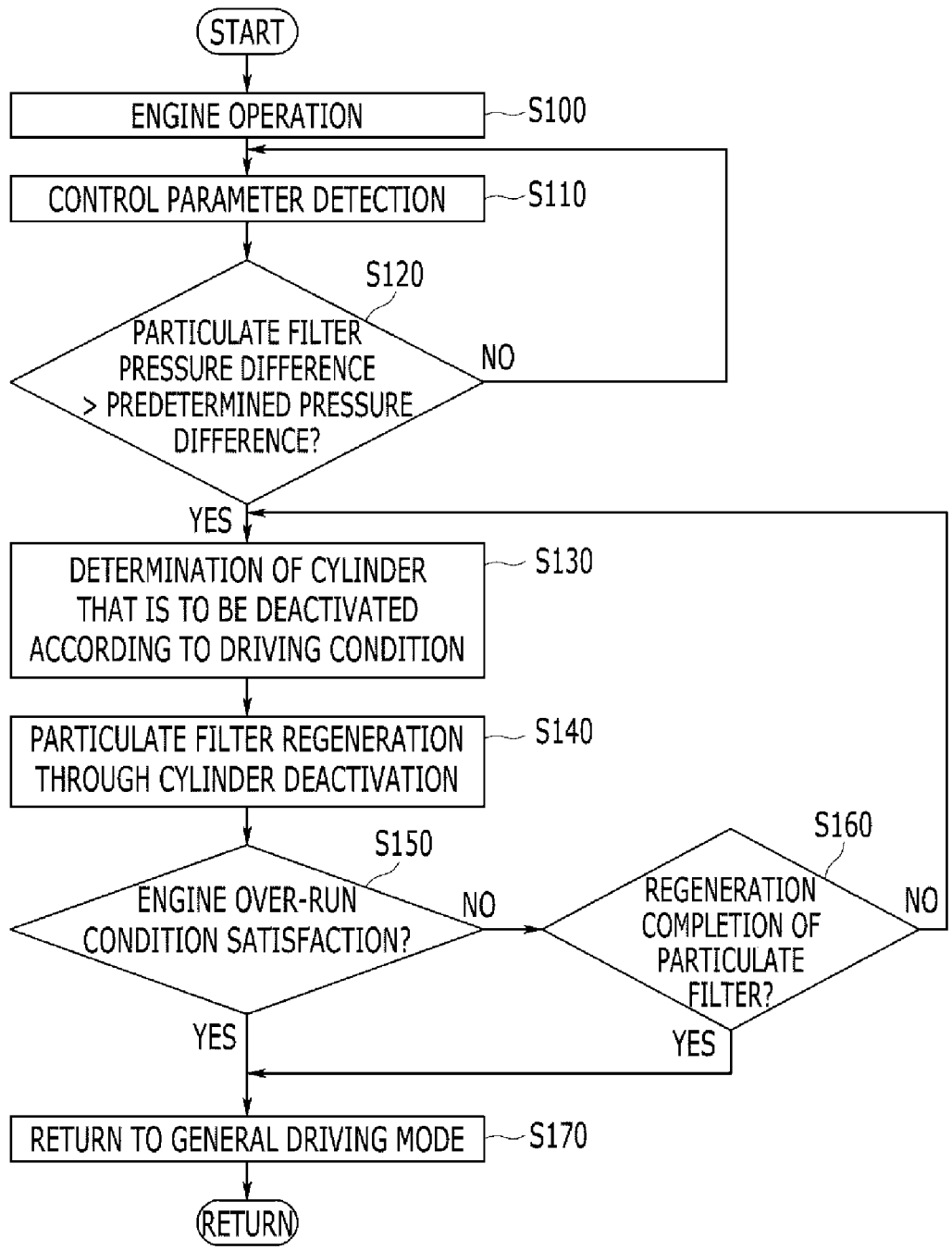
FIG. 3 is a control flowchart of an exhaust gas purification device according to an exemplary embodiment of the present invention.

FIG. 3 is a control flowchart of an exhaust gas purification device according to an exemplary embodiment of the present invention, and hereinafter, with reference to FIG. 3, a control flow of an exhaust gas purification device will be described according to an exemplary embodiment of the present invention.

Firstly, the exhaust gas purification device according to an exemplary embodiment of the present invention is applied in a condition that the engine 10 is being operated in S100. Then, a pressure difference between an upstream side and a downstream side of the gasoline particulate filter 30, a driving condition of the engine 10, and a condition of the gasoline particulate filter 30 are detected from the pressure difference sensor 32 and the control parameter measuring portion 50 in S110.

It is determined whether a pressure difference of the gasoline particulate filter 30 is larger than a predetermined value in S120, and if the pressure difference of the gasoline particulate filter 30 is larger than the predetermined value, a cylinder that is to be deactivated according to the driving condition of the engine 10 is determined in S130, and the fuel is not injected into the cylinder 12 that is to be deactivated and only air is supplied thereto such that the gasoline particulate filter 30 is sufficiently regenerated in S140. That is, if the pressure difference is larger than the predetermined value based on the signal of the pressure difference sensors 32 measuring the pressure difference between both ends of the gasoline particulate filter 30 so as to reduce the PM that is trapped in the gasoline particulate filter 30 that is disposed on the exhaust pipe 25 of the GDI engine 10, the ECU 40 issues an order for regenerating the gasoline particulate filter 30, deactivates a portion of the cylinders 12 by halting fuel supply thereto, and supplies air (oxygen) that is necessary to regenerate the gasoline particulate filter 30. The air amount that is necessary to regenerate the filter is determined by the driving condition of the engine and the condition of the gasoline particulate filter 30.

It is determined whether the engine 10 is in an over-run condition during the regeneration of the gasoline particulate filter 30 in S150, and if the engine is in the over-run condition, it is returned to a general driving mode in S170. That is, the deactivation mode is released and fuel is normally supplied to all cylinders. The reasons why it is determined whether the engine is in an over-run condition as stated above is to prevent a case that more air than needed is supplied to the gasoline particulate filter 30, wherein the case can be caused by a driving halt such as abrupt braking.

However, if it is determined that the regeneration of the gasoline particulate filter 30 is completed in a condition that the engine is not in an over-run condition in S160, it is returned to a general driving mode in S170, but if the regeneration thereof is not completed, it is returned to S130 wherein a cylinder that is to be deactivated is determined again to regenerate the gasoline particulate filter 30.

Hereinafter, a four cylinder engine according to an exemplary embodiment of the present invention will be further described.

While the four cylinder engine is being normally operated according to an exemplary embodiment of the present invention, the oxygen concentration of the exhaust gas is an average of about 1%. That is, when each cylinder 12 is normally operated, the exhaust gas oxygen concentration is about 1%. However, while one of the cylinders 12 is deactivated, oxygen concentration of the deactivate cylinder 12 is increased to 21%.

Accordingly, while three cylinders 12 are being operated and one cylinder 12 is deactivated, the oxygen concentration of the exhaust gas is about 6%, while two cylinders 12 are being operated and two cylinders 12 are deactivated, the oxygen concentration of the exhaust gas is about 11%, and while one cylinder 12 is being operated and three cylinders 12 are deactivated, the oxygen concentration of the exhaust gas is about 16%.

When the oxygen concentration is increased from 0.5% to 10%, the burning speed of the particulate matter (PM) is increased as much as five times at the same exhaust gas temperature to reduce the regeneration time, and when the oxygen concentration is increased from 1% to 10%, the temperature that the regeneration is started is decreased from 450° C. to 400° C. such that the filter can be regenerated at a lower temperature.

That is, the oxygen supply is not sufficient for regenerating the gasoline particulate filter 30 in a gasoline engine that is operated at an ideal air/fuel ratio according to an exemplary embodiment of the present invention, but sufficient oxygen can be supplied to smoothly regenerate the gasoline particulate filter by deactivating a portion of the cylinders.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust gas purification device having a gasoline particulate filter that is disposed on an exhaust pipe of a gasoline engine, comprising:

the engine that includes a plurality of cylinders of which at least one thereof is selectively deactivated;

the gasoline particulate filter that is disposed on the exhaust pipe that is connected to the engine so as to trap particulate matter of exhaust gas of the engine;

pressure difference sensors that are respectively disposed at a downstream side and an upstream side of the gasoline particulate filter to measure a pressure difference of the gasoline particulate filter; and an electronic control unit (ECU) that receives the measured pressure difference from the pressure difference sensors and detected control parameters through a control parameter measuring portion to determine cylinders to be deactivated, and that supplies the gasoline particulate filter with air through the deactivated cylinders so as to regenerate the gasoline particulate filter;

wherein the ECU terminates regeneration by reactivating the deactivated cylinders during an over-run condition of the engine.

2. The exhaust gas purification device of claim 1, further comprising a three-way catalyst that is disposed at an upstream side of the gasoline particulate filter.

3. The exhaust gas purification device of claim 1, wherein the control parameters include a driving condition of the engine and a condition of the gasoline particulate filter, wherein no driving problems are caused in a condition that a portion of the cylinders are deactivated.

4. A control method of an exhaust gas purification device of an engine that includes a plurality of cylinders of which at least one thereof is selectively deactivated and a gasoline particulate filter that is disposed on an exhaust pipe that is connected to the engine so as to trap particulate matter of exhaust gas of the engine, comprising:

comparing a pressure difference of the gasoline particulate filter in a downstream side and an upstream side thereof with a predetermined value;

determining a cylinder that is to be deactivated when the pressure difference is larger than the predetermined value;

regenerating the gasoline particulate filter by supplying the gasoline particulate filter with air through the deactivated cylinder;

determining whether the engine is in an over-run condition during the regeneration process; and terminating regeneration by reactivating any deactivated cylinders and returning to a general driving mode when the engine is in the over-run condition.

5. The control method of an exhaust gas purification device of claim 4, further comprising:

determining whether the gasoline particulate filter is regenerated when the over-run condition of the engine is not satisfied; and returning to the general driving mode when the regeneration is completed.

6. The control method of an exhaust gas purification device of claim 5, further comprising returning to a step for determining a cylinder that is to be deactivated when the regeneration of the gasoline particulate filter is not completed.

7. The control method of an exhaust gas purification device of claim 4, wherein the determination of the cylinder that is to be deactivated is performed with regard to a driving condition of the engine and a condition of the gasoline particulate filter.

* * * * *